April 14, 1931.  B. McCORMICK  1,800,869

METHOD OF MANUFACTURING SQUIRREL CAGE WINDINGS

Filed Jan. 31, 1930

Inventor
B. McCORMICK
By E. G. Huffman
Att'y.

Patented Apr. 14, 1931

1,800,869

UNITED STATES PATENT OFFICE

BRADLEY McCORMICK, OF ST. LOUIS, MISSOURI, ASSIGNOR TO WAGNER ELECTRIC CORPORATION, OF ST. LOUIS, MISSOURI, A CORPORATION OF DELAWARE

METHOD OF MANUFACTURING SQUIRREL-CAGE WINDINGS

Application filed January 31, 1930. Serial No. 424,760.

The method of making a resistance ring for a squirrel cage winding which comprises using a plurality of sheet metal punchings has proved satisfactory only when these ring elements are soldered to the conductor bars, since as the ring elements have heretofore been constructed, brazing or welding operations failed to join all of the elements properly to each bar. My invention relates to means by which the brazing and welding operations can be satisfactorily employed.

Figure 1:
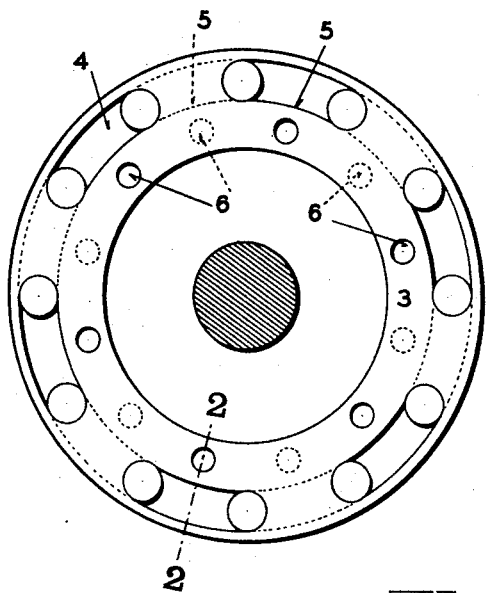
Figure 2:
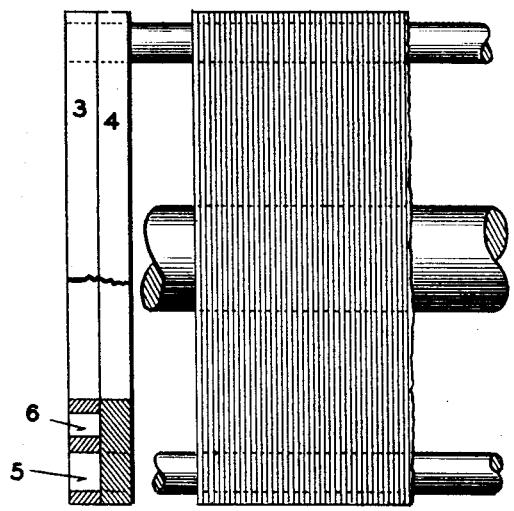

In the accompanying drawings, Figure 1 is an end view of a squirrel cage rotor constructed in accordance with my invention, and Figure 2 is a side view of one end of such a rotor, a portion of the end ring being omitted to show a cross-sectional view along the line 2—2′ of Figure 1.

In accordance with my method each end ring of the squirrel cage is made up of two ring elements 3 and 4, and in the preferred form of invention illustrated, these elements are identical and are provided with circumferentially extending slots 5, each of which is just long enough that it may embrace two adjacent conductor bars, as indicated in Figure 1.

In assembling the rings on the bars the ring slots are placed out of register, the dotted lines in Figure 1 indicating the position of the slots in the inner ring 4. This construction and assembly results in receptacles for brazing material being formed, the bottoms of which are imperforate portions of ring 4, and the side walls are the walls of the slots in ring 3. The joints between a particular bar and both of the rings communicate with the brazing material receptacles and the brazing material is confined to flow over these joints and therefore excellent physical and electrical union between each bar and each ring element is readily and reliably produced. If it is desired to make further electrical union between the ring elements, they may be provided with openings 6, which will be out of register when the elements are assembled on the bars, and those in ring element 3 form with the imperforate portions of the ring element 4 other receptacles for brazing material.

It will be understood that the openings in the inner ring element 4 may be only of such size and number as to receive the ends of the bars, but in view of the desirability from a manufacturing standpoint that the ring elements be all alike, I prefer such construction since my method of assembling the rings so permits.

Having fully described my invention, what I claim as new and desire to secure by Letters Patent of the United States is:

1. The method of interconnecting corresponding ends of the conductor bars of a squirrel cage winding which comprises assembling two rings of conductive material in juxtaposition on the ends of the bars, said rings being provided with openings for the passage of said bars, the bar openings of the outer ring being larger than the bar ends and the portions thereof not occupied by the bars being opposite imperforate portions of the other ring, whereby receptacles for brazing material are formed, each of which communicates with the joints between a bar and the rings.

2. The method of interconnecting corresponding ends of the conductor bars of a squirrel cage winding which comprises assembling two rings of conductive material in juxtaposition on the ends of the bars, said rings being provided with openings for the passage of said bars, the bar openings of the outer ring being larger than the bar ends and the portions thereof not occupied by the bars being opposite imperforate portions of the other ring, and then brazing or welding each ring to each bar.

3. The method of interconnecting the conductors of a squirrel cage winding which comprises employing two identical rings of conductive material provided with a plurality of closed slots each of a sufficient width to receive two adjacent conductor bars, assembling said rings in juxtaposition on the bars with the central portions of the slots out of register, and then conductively connecting each ring to each bar.

In testimony whereof, I hereunto affix my signature, this 21st day of January, 1930.

BRADLEY McCORMICK.